Patented Mar. 16, 1948

2,437,946

UNITED STATES PATENT OFFICE 2,437,946

PLASTICIZED PROLAMINE COMPOSITION

Cyril D. Evans, Peoria, Ill., and Ralph H. Manley, St. Paul, Minn., assignors to United States of America, as represented by the Secretary of Agriculture No Drawing. Application July 27, 1944, Serial No. 546,900

4 Claims. (Cl. 106—153)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to solidifying compositions containing prolamine as the essential solidifying ingredient thereof and containing plasticizers. Such compositions are suitable for coatings and the manufacture of films, filaments, and molded plastics, and the invention has among its objects the obtaining of compositions which produce clear, transparent, flexible and waterproof coatings and films.

Known plasticizers for film-forming and coating compositions include many types of compounds, most of which are water-soluble materials, such as glycols, glycerin, and polyglycols. Use of such plasticizers renders the compositions subject to attack by water, thus materially limiting their utility. Other compounds which are substantially water-insoluble, such as dibutyl tartrate, dibutyl lactate, dibutyl phthalate, and ortho and para toluene sulfonamide offer only limited plasticization to protein films once the films are thoroughly dried.

We have found that the lactic acid amides, particularly the N-butyl lactamides including N-dibutyl lactamide and the N-monobutyl lactamide, are excellent plasticizers for the prolamines. These amides impart to a protein film excellent plastic properties and yield a clear, tough, transparent, flexible film. The N-dibutyl lactamide is a water-insoluble compound, and for this reason extends the use of prolamines into new fields which have previously been avoided because of the lack of a suitable water-insoluble plasticizer.

The N-monobutyl lactamide is also an excellent plasticizer for the prolamines. This amide is, however, water soluble, but it possesses the property of reacting with aldehydes, and a product, which is obtained, for example, by reacting aldehyde and a prolamine thus to produce an aldehyde-hardened prolamine and using the plasticizer, is suitable as a coating on wrapping material, and when given a drying treatment will yield a clear, plastic film which does not blush on long immersion in water.

The lactamides obtained by reacting diamines and polydiamines with lactic acid also form excellent prolamine plasticizers for the purposes of this invention. The compounds thus formed are either water insoluble or water soluble, depending upon the amine used. The polyethylene diamines are water-soluble compounds which possess the property of reacting with aldehydes, and they may be compounded with the prolamines and then reacted with the aldehyde. Plasticizing compounds of this type are the dilactamides of ethylene diamine, of propylene diamine, of hexamethylene diamine, and of the polyethylene polyamines, such as diethylene triamine, triethylene tetramine, and so forth.

Examples of some of the lactamides described above are illustrated in the structural formulas

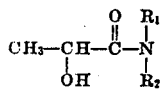

where $R_1$ is selected from the group consisting of a hydrogen atom, and alkyl group and an aromatic group, and $R_2$ is selected from the group consisting of an alkyl group and an aromatic group, these structures being obtained by reacting primary and secondary amines with lactic acid; and

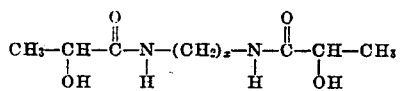

where $x$ is an integer not less than 2, these structures being obtained by reacting diamines with lactic acid.

The compatibility of plasticizing compounds of these types with the prolamines, and consequently their effectiveness as plasticizers, may be increased when necessary by incorporation with them of small amounts of active nitrogen compounds which by themselves need not be compatible with the prolamine.

The following examples are illustrative of the manner in which the invention may be practiced.

Example I

Twenty parts of zein was dissolved in 80 parts of 90 percent ethyl alcohol to which 8 parts of N-monobutyl lactamide was added as the plasticizer, giving a clear solution.

The composition thus obtained may be used without further treatment, although in some instances it is desirable to add a small percentage of some higher boiling zein solvent to it, such as ethylene glycol monoethyl ether, to control the rate of evaporation. The composition may be applied on paper as a coating by means of a doctor blade, or it may be cast upon a polished glass or metal surface and stripped therefrom after evaporation of the solvent to form a thin, transparent flexible sheet.

*Example II*

The same composition as in Example I was prepared except with the addition of 1 to 5 parts of aqueous 37 percent formaldehyde as a protein fixative agent. The solution was then heated on a water bath for a short time, and after cooling, films or coatings were made in the usual manner.

If after partial air drying, the coatings or films are further dried in an oven or with infra-red lamps at temperatures slightly over 100° C., superior coatings or films result. A film or coating obtained in this manner is clear, flexible, and transparent, and possesses excellent water resistance.

*Example III*

Twenty parts of zein was dissolved in 80 parts of 90 percent ethyl alcohol to which 10 parts of N-dibutyl lactamide was added as a plasticizer. This composition may be used as in Example I. Also, a protein fiixative agent may be added as in Example II, and the solution warmed on a steam bath for a short time before casting the films. Drying at a temperature slightly above 100° C. gives improved films which show only slight blush on long immersion in water.

*Example IV*

This example is similar to Example I, except for the substitution of 8–10 parts of dilactamide of diethylene triamine as the plasticizer. This composition when cast in form of films or coatings gives transparent, flexible, yellow films of excellent strength.

*Example V*

One to 5 parts of aqueous 37 percent formaldehyde was added to the composition of Example IV and the solution warmed for a short time on a water bath. The addition of catalysts such as acids, ammonium chloride and other acidic compounds to promote the aldehyde-zein reaction may also be incorporated into this solution. Very satisfactory films can be made by using a slightly acidic solution containing the formaldehyde or other active aldehyde and carrying out the final drying at elevated temperatures. Films thus obtained are tough, transparent and flexible, and have a slightly yellow color.

Having thus described the invention, what is claimed is:

1. A coating composition consisting essentially of prolamine as the essential film-forming ingredient thereof, and N-butyl lactamide as a plasticizer.

2. A coating composition consisting essentially of prolamine as the essential film-forming ingredient thereof, and N-monobutyl lactamide as a plasticizer.

3. A solidifying composition consisting essentially of aldehyde-hardened prolamine as the essential solidifying ingredient thereof, and N-monobutyl lactamide as a plasticizer.

4. A solidifying composition consisting essentially of prolamine as the essential solidifying ingredient thereof, and a plasticizing compound selected from the group consisting of

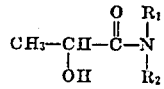

where $R_1$ is selected from the group consisting of a hydrogen atom, an alkyl group and an aromatic group and $R_2$ is selected from the group consisting of an alkyl group and an aromatic group; and

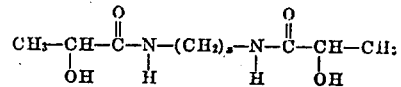

where $x$ is an integer not less than 2.

CYRIL D. EVANS.
RALPH H. MANLEY.

REFERENCES CITED

The following references are of record in the file of this patent:

UNITED STATES PATENTS

| Number | Name | Date |
| --- | --- | --- |
| 2,322,486 | Swallen | June 22, 1943 |
| 2,250,664 | Watkins | July 29, 1941 |
| 2,211,327 | Gordon | Aug. 13, 1940 |
| 2,170,845 | Woodhouse | Aug. 29, 1939 |
| 2,146,873 | Willmanns | Feb. 14, 1939 |
| 2,115,716 | Hansen | May 3, 1938 |
| 2,070,991 | Hund | Feb. 16, 1937 |
| 1,986,854 | Reid | Jan. 8, 1935 |